Feb. 27, 1968  H. I. BARRETT  3,370,767
GLASS CUTTING DEVICE
Filed Feb. 28, 1966
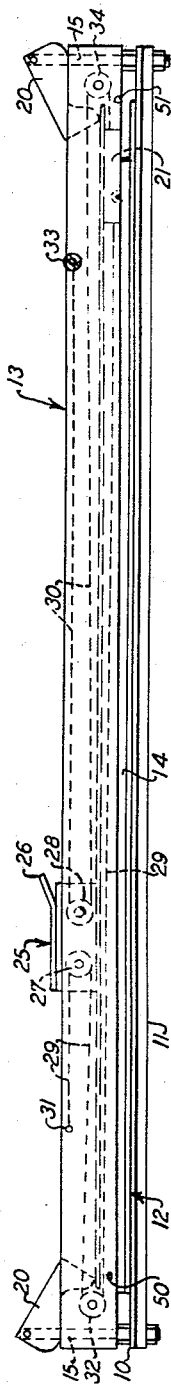
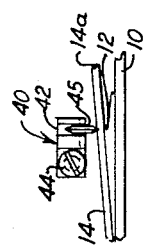
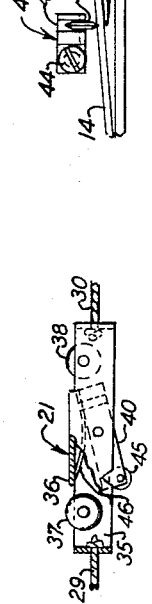
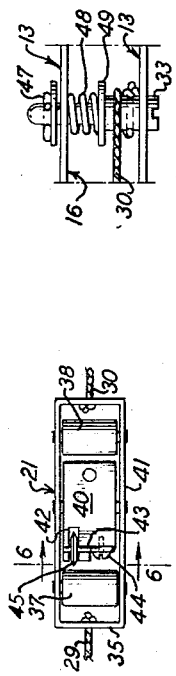
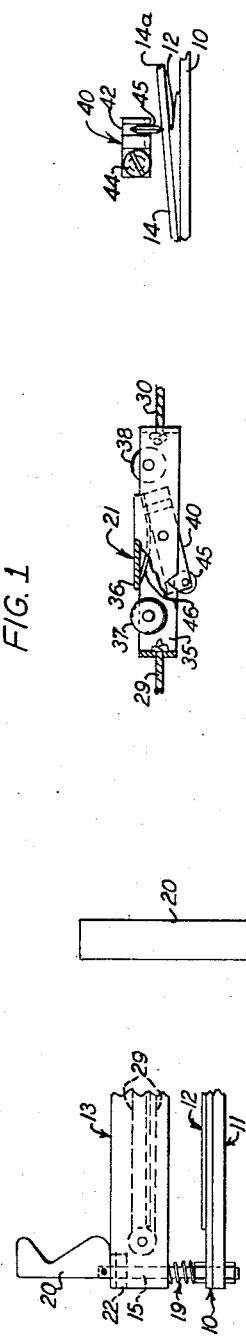
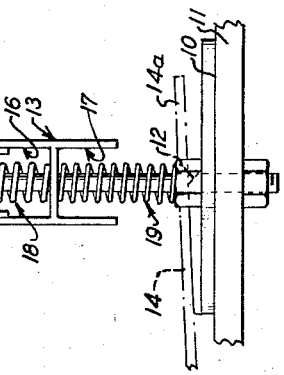
INVENTOR
HERBERT I. BARRETT
BY
Mauro & Lewis
ATTORNEYS

United States Patent Office 3,370,767
Patented Feb. 27, 1968

3,370,767
GLASS CUTTING DEVICE
Herbert I. Barrett, Missoula, Mont., assignor to B & B Industries, Inc., Missoula, Mont., a corporation of Montana
Filed Feb. 28, 1966, Ser. No. 530,269
7 Claims. (Cl. 225—96.5)

This invention relates to a glass cutting device.

The invention is preferably characterized first by an elongated base member adapted for attachment to an edge of a support, such as a portable board having a measuring ruler mounted at right angles to the base member for measuring a glass segment to be cut into portions, or to cut away an excess amount. The base member carries a shoulder forming an elevation in such a manner that a piece of glass placed thereover, after a scoring operation, may be broken apart manually or by mechanical means.

Co-operating with the base member is a resiliently mounted cutter bar assembly, having a track carrying a cutter wheel device, with its cutter wheel also resiliently mounted, in register with the shoulder of the base member. The cutter wheel is operated to score a glass segment placed over the shoulder, after which it is easily broken. The cutter bar assembly is equipped with a control handle mounted in another track and attached to the cutter wheel device by means of a pulley-cable system providing an advantageous movement ratio. A cable tensioning device is included.

The cutter bar assembly is spring-mounted upon the base member and equipped with controls for spacedly moving it relative to the base member in order to insert, adapt to, and remove glass segments to be cut.

The device may obviously be mounted otherwise as on a table, wall or other support instead of on a portable board. It may be used to cut or score sheet material other than glass.

The device is advantageously constructed so that nearly no skill is required of the operator. Successive pieces of glass may be scored and cut with extreme rapidity, in part due to the pulley-cable arrangement whereby a given movement of the operating handle is transmitted into a movement of double the distance by the cutter wheel. The device automatically adjusts to glass pieces of different thickness. The device delivers glass pieces cut to precise measurements, and glass strips as small as 1/8 inch can be cut from a glass piece. By the manipulation of two simple controls, the cutter bar assembly can be raised or lowered for insertion or removal of successive glass pieces to be cut. Provision is made also to compensate for wear of the cutter wheel, for easy replacement of a wornout cutter wheel, and for adjustment of the tension of the pulley cable.

Other features of the device will be understood from a description of the drawing, wherein:

FIG. 1 is a side elevation of the invention, showing the cutter bar assembly (with internal parts in dotted lines), mounted above a base member and its supporting board, the assembly being in closed position just prior to completion of a glass-scoring operation;

FIG. 2 is a partial side elevation of one of the two end support and control members serving to mount the cutter bar assembly over the base member, the assembly being in open or inoperative position for insertion of a glass piece to be cut;

FIG. 3 is an elevation, enlarged and from the end, showing the parts of FIG. 2 in the same position;

FIG. 4 is an enlarged side view, partly in section, of the cutter member;

FIG. 5 is a bottom plan view of the cutter of FIG. 4;

FIG. 6 is an end elevation showing the cutter wheel in operative position, taken on lines 6—6 of FIG. 5; and FIG. 7 is an enlarged top plan view of the cable tensioning device.

In these views, the base member is indicated at 10, bolted to a support of choice 11, such as a portable board. Base 10 is seen in section in FIGS. 3 and 6, being beveled to form a shoulder 12 positioned beneath the cutter member, a pair of posts 15, one at either end of the base member 10 form supports for the cutter bar assembly 13. As viewed in FIG. 1, the device is in closed or partially operated position with a glass piece 14 in position for the scoring operation, extended across shoulder 12 to leave an excess (or selected) piece 14a to be removed (FIG. 3). Base 10 is preferably formed of aluminum so that contact with the cutter wheel will not dull the latter.

Cutter bar assembly 13 is resiliently mounted on posts 15, the posts being bolted to base member 10. Assembly 13 is H-shaped in cross section, thus providing a pair of upper and lower slots or tracks 16 and 17, FIG. 3. Journaled on the upper part of posts 15 are a pair of relatively strong springs 18 resting on the upper bar of the H-frame and beneath are the relatively weak springs 19 bearing on the underside of assembly 13.

Capping each post is pivotally mounted a cam-type control 20 shaped to raise and lower the cutter bar assembly 13 from an open position, FIGS. 2 and 3, (for insertion of glass) to an operative or scoring position, FIG. 1. It will be seen from the views that by depressing the controls 20 from the FIGS. 2–3 position to the FIG. 1 position, the cutter bar assembly 13 is brought into operative position closely adjacent the surface of glass segment 14. The combined action of springs 18–19 results in a resilient contact between the cutter member 21 carried by assembly 13 and the glass 14, also making due allowance for the thickness of the latter. Cams 20 bear on the caps 22, FIG. 3.

A control handle 25 is composed of a rectangular body in the shape of an inverted "U," adapted to fit within the upper track 16 and to slide therein. A finger grab 26 is provided on top of handle 25. Within the body of handle 25 are mounted the spaced pulley wheels 27–28. A pair of pulley cords or cables 29 and 30 connect control handle 25 to opposite ends of the cutter member 21. The top end of cable 29 leads from a stop pin 31 mounted across track 16, over pulley 27, thence to pulley 32, and thence to a connection with one end of cutter member 21. Cable 30 leads from a tensioning bolt 33, over pulley 28, thence to pulley 34, and thence to a terminus at the opposite end of cutter member 21.

It will be seen from the foregoing arrangement that since each pulley cable 29–30 is trained over a pair of pulleys 27–32 and 28–34 respectively, movement by the operator of the control handle 25 produces movement of double that distance in the cutter member 21.

Cutter member 21 includes a rectangular frame 35 adapted to fit and slide within the lower track 17 of the cutter bar assembly. Holes are bored at each end for the reception of the ends of cables 29 and 30. A saddle 36 straddles the top of frame 35 (FIG. 4). A pair of spaced rollers 37–38 are journaled across frame 35 for contact with the roof of slot 17 when the cutter member 21 is operational. A cutter holder 40 is pivotally mounted at 41 within the frame 35.

The forward or depending end of holder 40 contains a slot 42 which is transversed by a shaft 43 held by a setscrew 44. The cutter wheel 45 is rotatably mounted on shaft 43 within the slot 42. To replace the cutter wheel 45, the set-screw 44 is loosened and the shaft 43 pivoted so as to withdraw cutter wheel 45 from slot 42 and thus free it for removal.

Cutter holder 40 further carries on its top a leaf spring 46 mounted in the position shown in FIG. 4, and bearing against the saddle 36. Spring 46 tends to force holder 40 and cutter wheel 45 into the position shown in FIG. 4. It will be understood, however, that spring 46 is an additional resilient means (in conjunction with springs 18–19) to accommodate the cutter bar assembly and the cutter member 21 into operative contact with a given thickness of glass to be scored. Stop pins 50–51 limit the movement of cutter member 21 and hence that of handle 25.

A cable-tensioning means or bolt 33 is shown in FIG. 1, and a detail is shown in FIG. 7. Bolt 33 is journaled across the walls of track 16 and held in place by a cotter 47. A spring 48 bearing on a shoulder 49 resists rotation of bolt 33. The top end of cable 30 is secured in a bore through bolt 33. Rotation of bolt 33 clockwise causes cable 30 to wrap around bolt 33, thus tensioning the entire cable system and parts.

*Operation.*—With the control cams 20 in the raised position as in FIGS. 2–3, the cutter bar assembly 13 is raised by the effort of springs 19 and a piece of glass may be easily positioned to extend across the shoulder 12 over which the cutter wheel 45 is precisely located. Control handle 25 is initially moved to the extreme right of FIG. 1 so that cutter member 21 is moved to the extreme left (limited by stops 50–51) so that thereafter a lowering of the control cams 20 brings the cutter bar assembly down with cutter 21 in operative position. By pulling left on handle 25, cutter 25 will be moved to the right, across glass 14, scoring it. By using the leverage given by shoulder 12, the glass segment 14a may be broken away. In FIG. 1, the parts are shown in a position depicting the cutter member 21 as reaching the end of the scoring operation above described.

What is claimed is:

1. In a cutting device for glass or the like, a base member adapted for attachment to a support such as a carrying board or the like, said base member having a shoulder forming a raised portion with respect to said support and adapted for breaking scored glass thereover, said shoulder extending longitudinally of said base member, a pair of upstanding connecting means spaced apart on said base member, a cutter bar assembly carried by said connecting means for movement relative to said base member, said assembly further having spring means interposed between said cutter bar assembly and said base member holding said assembly and said member resiliently in spaced relation, said assembly further having control means for moving said assembly in the direction of said base member against the resistance of said spring means, said assembly further having a first track means juxtaposed above said shoulder and carrying a cutter member having glass scoring means in register with said shoulder, said assembly further having a second track means carrying a cutter control, said cutter control and said cutter member being interconnected by cable means carried by said assembly in such disposition that movement of said cutter control is transmitted to said cutter member.

2. The invention according to claim 1, wherein said cable means are trained over a series of pulley members carried by said assembly in such position to provide amplified movement by said cutter member in response to movement of said cutter control.

3. The invention according to claim 1, wherein said control means for moving said assembly comprise a pair of cams operatively bearing against said spring means.

4. The invention according to claim 1, wherein said cutter member is provided with independent resilient means affording resiliency with respect to said cutter bar assembly.

5. The invention according to claim 1, wherein said cable means are provided with a tensioning device.

6. The invention according to claim 1, wherein said cutter bar assembly is of hollow construction affording upper and lower tracks carrying said cutter control above said cutter member, the two being operatively joined by said cable means for operation of the latter by the former.

7. The invention according to claim 1, wherein said cutter control is provided with a pair of spaced pulleys, and wherein said cable means is anchored to said assembly, trained over said spaced pulleys and over a further pair of spaced pulleys carried by said assembly, and thence connected to opposite ends of said cutter member for operation thereof in either direction.

References Cited
UNITED STATES PATENTS

| | | | |
|---|---|---|---|
| 1,341,262 | 5/1920 | Colburn | 225—96.5 X |
| 2,591,828 | 4/1952 | Judd | 225—96.5 X |
| 2,711,617 | 6/1955 | Trammell | 225—96.5 |
| 3,207,398 | 9/1965 | Bo Gösta Frorsström | 225—96 |

JAMES M. MEISTER, *Primary Examiner.*